(12) United States Patent
Shrapnel

(10) Patent No.: US 11,998,492 B2
(45) Date of Patent: Jun. 4, 2024

(54) STRETCHER LOADING ASSEMBLY

(71) Applicant: HeliMods Pty Ltd, Brisbane (AU)

(72) Inventor: Will Shrapnel, Brisbane (AU)

(73) Assignee: HeliMods Pty Ltd, Brisbane (AU)

( * ) Notice: Subject to any disclaimer, the term of this patent is extended or adjusted under 35 U.S.C. 154(b) by 534 days.

(21) Appl. No.: 16/491,304

(22) PCT Filed: Feb. 27, 2018

(86) PCT No.: PCT/AU2018/050172
§ 371 (c)(1),
(2) Date: Sep. 5, 2019

(87) PCT Pub. No.: WO2018/161107
PCT Pub. Date: Sep. 13, 2018

(65) Prior Publication Data
US 2020/0038268 A1 Feb. 6, 2020

(30) Foreign Application Priority Data
Mar. 8, 2017 (AU) .............................. 2017100274

(51) Int. Cl.
*A61G 3/06* (2006.01)
*A61G 3/02* (2006.01)
*B64D 9/00* (2006.01)

(52) U.S. Cl.
CPC ............ *A61G 3/062* (2013.01); *A61G 3/0245* (2013.01); *B64D 9/00* (2013.01)

(58) Field of Classification Search
CPC ...... B64C 1/20; A61G 3/0254; A61G 3/0245; B64D 2011/009
See application file for complete search history.

(56) References Cited

U.S. PATENT DOCUMENTS

| | | | | |
|---|---|---|---|---|
| 5,076,515 A * | 12/1991 | Goon | ...................... | B64D 9/00 414/471 |
| 5,490,703 A * | 2/1996 | Hewko | ................ | A61G 1/0293 244/118.6 |
| 5,738,306 A * | 4/1998 | Moss | ...................... | B64D 9/00 244/118.6 |
| 5,779,296 A * | 7/1998 | Hewko | ................ | A61G 3/0866 244/118.6 |
| 5,785,277 A * | 7/1998 | Manning | .................. | B64D 9/00 244/118.6 |
| 5,827,022 A | 10/1998 | Tovani | | |
| 9,284,130 B1 * | 3/2016 | Himmelmann | ........... | B64C 1/20 |
| 9,545,345 B1 * | 1/2017 | Akers, Jr. | .............. | A61G 3/029 |

(Continued)

FOREIGN PATENT DOCUMENTS

FR 2682930 A1 4/1993
WO 2015164147 A1 10/2015

*Primary Examiner* — Kaitlin S Joerger
(74) *Attorney, Agent, or Firm* — The Webb Law Firm

(57) ABSTRACT

A stretcher loading assembly including a support member operatively attachable to an aircraft floor, an elongate rail member attached to the support member, an elongate traverse beam movably attached to the rail member, and a trolley assembly movably attached to the traverse beam, the trolley assembly including lifting means movable between a lowered position and a raised position, the lifting means adapted to support a stretcher in the raised position, wherein the support member is at least twice as wide as the rail member.

12 Claims, 15 Drawing Sheets

(56) References Cited

U.S. PATENT DOCUMENTS

| | | | |
|---|---|---|---|
| 10,512,571 B2 | 12/2019 | Carletti | |
| 2003/0143052 A1* | 7/2003 | Fehrle | B64C 1/20 |
| | | | 410/46 |
| 2006/0181100 A1* | 8/2006 | Lambarth | A61G 1/0237 |
| | | | 296/20 |
| 2009/0015027 A1* | 1/2009 | Lambarth | A61G 3/0245 |
| | | | 307/104 |
| 2009/0276959 A1* | 11/2009 | Menna | A61G 1/013 |
| | | | 5/611 |
| 2010/0045059 A1* | 2/2010 | Bourgraf | A61G 3/0272 |
| | | | 296/19 |
| 2011/0080016 A1* | 4/2011 | Lambarth | A61G 3/0883 |
| | | | 296/20 |
| 2012/0117730 A1* | 5/2012 | Lemire | A61G 7/1042 |
| | | | 5/611 |
| 2012/0237326 A1* | 9/2012 | Van Ness | A61G 3/0236 |
| | | | 414/812 |
| 2013/0127198 A1* | 5/2013 | Menna | A61G 3/0825 |
| | | | 296/19 |
| 2016/0244186 A1* | 8/2016 | Brown | B64F 5/60 |
| 2017/0296404 A1* | 10/2017 | Burkeen | A61G 3/0883 |
| 2020/0188198 A1* | 6/2020 | Braun | A61G 3/029 |
| 2021/0147004 A1* | 5/2021 | Sandell | B62D 21/02 |
| 2021/0161738 A1* | 6/2021 | Akers, Jr. | A61G 3/0254 |

* cited by examiner

STRETCHER LOADING ASSEMBLY

CROSS-REFERENCE TO RELATED APPLICATIONS

This application is the United States national phase of International Application No. PCT/AU2018/050172 filed Feb. 27, 2018, and claims priority to Australian Patent Application No. 2017100274 filed Mar. 8, 2017, the disclosures of which are hereby incorporated by reference in their entirety.

FIELD OF INVENTION

The present invention relates to a stretcher loading assembly. Reference will be made in the specification to the use of the invention with respect to aircraft. The patent specification describes this use, but it is by way of example only and the invention is not limited to this use.

BACKGROUND OF THE INVENTION

When patients are transferred from road ambulances to aircraft, paramedics are required to lift and transfer patients from road ambulance stretchers to aircraft stretchers.

Such transfers increase the response time and increase the possibility of further trauma to the patient.

Additionally, transfers of patients from road ambulance stretchers to aircraft stretchers increases the risk of paramedic injury due to spinal compression and shear forces.

An additional problem is the loading and unloading of stretchers from aircraft. Powered stretcher loaders have been used in road ambulances to assist with the loading and unloading of heavy stretchers. These powered stretchers cannot be used with aircraft due to their weight and the regulations governing airworthiness and safety requirements of items used in aviation.

OBJECT OF THE INVENTION

It is an object of the present invention to overcome or at least alleviate one or more of the above-mentioned problems with the transfer and loading of stretchers and/or provide the consumer with a useful or commercial choice.

SUMMARY OF THE INVENTION

In one aspect, the present invention broadly resides in a stretcher loading assembly including
a support member operatively attachable to an aircraft floor;
an elongate rail member attached to the support member;
an elongate traverse beam movably attached to the rail member; and
a trolley assembly movably attached to the traverse beam, the trolley assembly including lifting means movable between a lowered position and a raised position, the lifting means adapted to support a stretcher in the raised position;
wherein the support member is wider than the rail member to distribute the weight over a wider surface area.

In another aspect, the present invention broadly resides in a stretcher loading assembly including
a support member operatively attachable to an aircraft floor;
an elongate rail member attached to the support member;
an elongate traverse beam movably attached to the rail member; and
a trolley assembly movably attached to the traverse beam, the trolley assembly including lifting means movable between a lowered position and a raised position, the lifting means adapted to support a stretcher in the raised position;
wherein the support member is at least twice as wide as the rail member.

In a further aspect, the present invention broadly resides in a stretcher loading assembly including
a support member operatively attachable to an aircraft floor;
an elongate rail member attached to the support member;
an elongate traverse beam movably attached to the rail member; and
a trolley assembly movably attached to the traverse beam, the trolley assembly including lifting means movable between a lowered position and a raised position, the lifting means adapted to support a stretcher in the raised position;
wherein the support member is at least 500 mm in width.

The support member preferably includes an attachment track adjacent each lateral side. Each of the attachment tracks is preferably an L-track. Preferably the support member includes attachment members attached to the attachment tracks. Preferably, the attachment members attach to a stretcher when the stretcher is located above the support member. Preferably the attachment members attach to the stretcher using straps.

In one embodiment, the support member is attached directly to the aircraft floor. The support member is preferably attached to the aircraft floor by fasteners such as bolts.

In another embodiment, the support member is attached to tracks attached to or incorporated into the aircraft floor. The support member is preferably attached to the tracks by a plurality of studs attached to the support member. Each of the plurality of studs is preferably releasably and movably attached to one of the tracks.

The support member preferably includes a plurality of apertures so that the studs can be attached using fasteners. The fasteners are preferably screws or bolts.

In one embodiment, the studs are oriented to fit into tracks that run in a substantially longitudinal direction relative to the aircraft, when the support member is oriented in a substantially lateral direction relative to the aircraft. In another embodiment, the studs are oriented to fit into tracks that run in a substantially lateral direction relative to the aircraft, when the support member is oriented in a substantially lateral direction relative to the aircraft.

In one embodiment, the stretcher loading assembly includes a turntable member located between the support member and the aircraft floor. The turntable member preferably enables the support member to be rotated relative to the aircraft floor. The turntable member is preferably attached to the tracks by a plurality of studs attached to the turntable member. Each of the plurality of studs is preferably releasably and movably attached to one of the tracks.

In one embodiment, the stretcher loading assembly includes one or more stop levers movable between a first position in which the plurality of studs are movable relative to the tracks and a second position in which the plurality of studs are secured relative to the tracks. Preferably when the one or more stop levers are in a second position, the plurality of studs are secured in the tracks.

The support member preferably includes a plurality of spacers to support the support member on the aircraft floor. The spacers are preferably attached to the support member. The support member preferably includes a plurality of apertures so that the spacers can be attached using fasteners. The fasteners are preferably screws or bolts.

The support member is preferably at least 1.5 m in length. More preferably, the support member is between 1600 mm and 1800 mm in length. In one embodiment, the support member is approximately 1.7 m in length. The support member is preferably at least 500 mm in width. More preferably, the support member is between 600 mm and 700 mm in width. In one embodiment, the support member is substantially 600 mm in width.

The support member is preferably made substantially from aluminium or an aluminium alloy. Alternatively, the support member can be made substantially from a carbon fibre or glass fibre composite material.

The support member may also be referred to as an interface member or interface.

The rail member is preferably attached to a central portion of the support member. The rail member is preferably more than 1.5 m in length. More preferably the rail member is over 2 m in length. The rail member preferably includes a securing portion adapted to secure the trolley assembly to the rail member.

The traverse beam is preferably slidably mounted relative to the rail member. More preferably the traverse beam is slidably mounted to the rail member. The traverse beam preferably extends in substantially the same direction as the rail member. The traverse member is preferably movable between a retracted position relative to the rail member and an extended position relative to the rail member. In the retracted position, the traverse member preferably substantially overlies the rail member. Preferably in the extended position at least a portion of the traverse member extends away from the rail member. The traverse beam is preferably over 1.5 m in length. More preferably the traverse member is over 2 m in length.

The trolley assembly is preferably slidably mounted relative to the traverse beam. More preferably the trolley assembly is slidably mounted to the traverse beam. The trolley assembly is preferably movable between a retracted position and an extended position. The retracted position is preferably adjacent the end of the traverse beam that remains close to the rail member in the extended position. The extended position is preferably adjacent to the end of the traverse beam that is located away from the rail member in the extended position.

The lifting means are preferably one or more lifting arms. More preferably the lifting means are two lifting arms. The lifting means is preferably hydraulically movable between the lowered position and the raised position. The trolley assembly preferably includes hydraulic means to hydraulically move the lifting means. The hydraulic means preferably includes one or more hydraulic cylinders. The trolley assembly preferably includes an electric motor to power a hydraulic pump to provide hydraulic power to the hydraulic means. The lifting means preferably secures to the stretcher in the raised position.

Preferably the stretcher loading assembly conforms to aviation standards CS 29 Amendment 4. Preferably the stretcher loading assembly conforms to aviation standards JAR 29 Amendment 3. Preferably the stretcher loading assembly conforms to aviation standards FAR 29 Amendments 29-1 through 29-47.

In another aspect, the present invention broadly resides in an aircraft having
  a stretcher loading assembly including
    a support member operatively attached to a floor of the aircraft;
    an elongate rail member attached to the support member;
    an elongate traverse beam movably attached to the rail member; and
    a trolley assembly movably attached to the traverse beam, the trolley assembly including lifting means movable between a lowered position and a raised position, the lifting means adapted to support a stretcher in the raised position;
  wherein the support member is at least twice as wide as the rail member.

In one embodiment, the aircraft is a helicopter. In another embodiment, the aircraft is a fixed wing aircraft.

In a further aspect, the present invention broadly resides in a method of loading a stretcher into an aircraft, using a stretcher loading assembly as described in this specification, the method including the steps of
  moving the traverse beam to an extended position relative to the rail member;
  moving the trolley assembly along the traverse beam to an extended position distal to the rail member when the traverse beam is in the extended position;
  moving the lifting arms to the lowered position;
  positioning a stretcher adjacent the loading assembly;
  moving the lifting arms to the raised position to support the stretcher;
  moving the trolley assembly to a retracted position proximal to the rail member; and
  moving the traverse beam to a retracted position relative to the rail member.

Preferably the method further includes the step of securing the stretcher to the support member.

Preferably the step of securing the stretcher to the support member includes securing the stretcher to the attachment tracks of the support member. Preferably the stretcher is attached to attachment members by straps, and the attachment members are attached to the attachment tracks of the support member.

Preferably the method further includes the step of lowering the lifting arms towards the lowered position when the trolley assembly is in the retracted position such that the stretcher is lowered onto the traverse beam. Preferably, when the stretcher is lowered onto the traverse beam, the stretcher engages with and is secured to the traverse beam.

The features described with respect to one aspect also apply where applicable to all other aspects of the invention. Furthermore, different combinations of described features are herein described and claimed even when not expressly stated.

BRIEF DESCRIPTION OF THE DRAWINGS

In order that the present invention can be more readily understood reference will now be made to the accompanying drawings which illustrate a preferred embodiment of the invention and wherein.

DETAILED DESCRIPTION OF THE PREFERRED EMBODIMENTS

Figure 1:
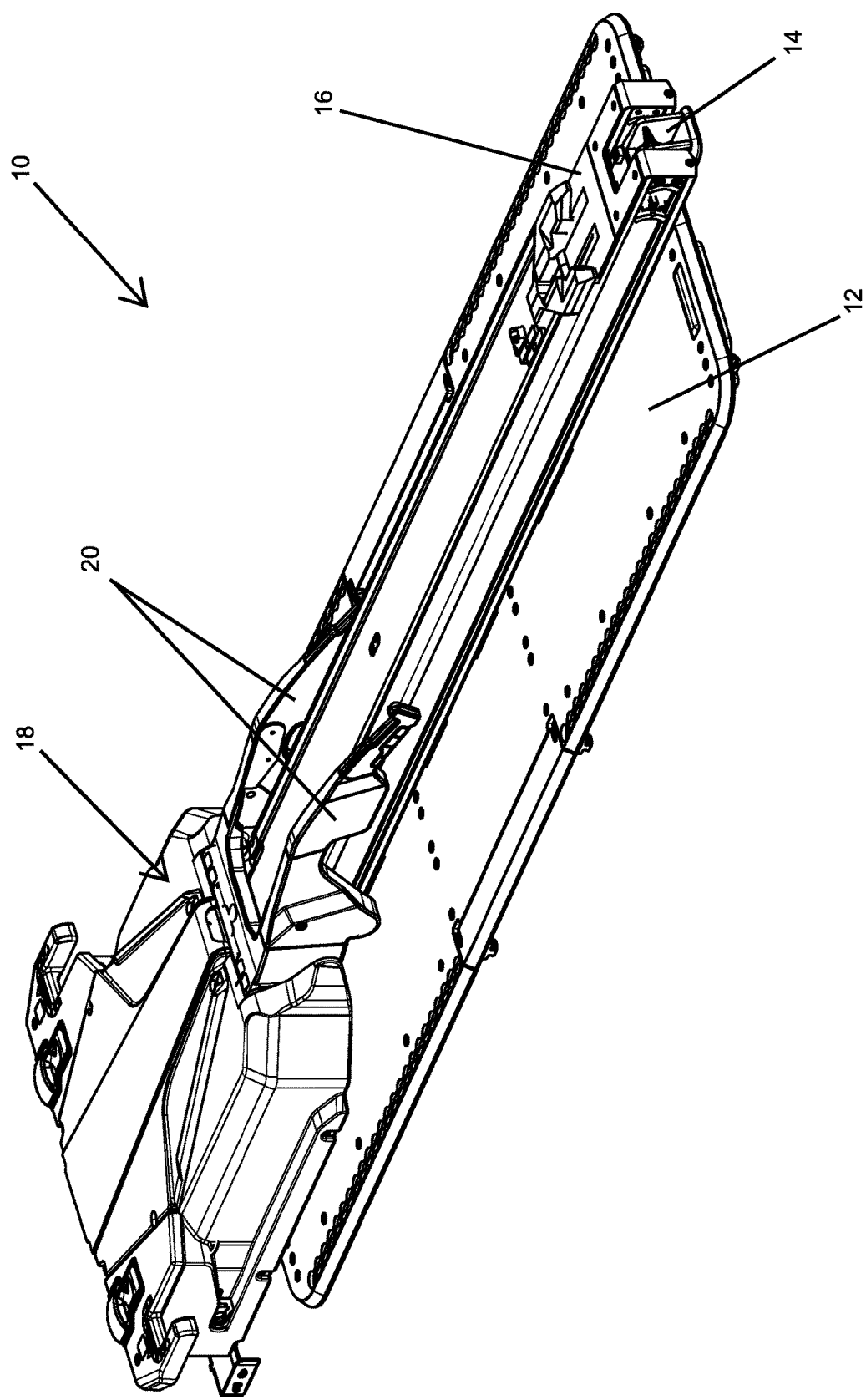
FIG. 1 is a perspective view of a stretcher loading assembly according to a preferred embodiment of the present invention.

With reference to FIG. 1 there is shown a stretcher loading assembly 10 according to a preferred embodiment of the present invention. The stretcher loading assembly 10 includes a support member 12 which is attachable to an aircraft floor (not shown).

A rail member 14 is centrally attached to the support member 12. A traverse beam 16 is movably attached to and supported by the rail member 14. The traverse beam 16 is able to slide along the rail member 14 between a retracted position (shown) and an extended position (not shown).

A trolley assembly 18 is movably attached to and supported by the traverse beam 16. The trolley assembly 18 is able to slide along the traverse beam between a retracted position (shown) and an extended position (not shown).

The trolley assembly 18 includes lifting means in the form of lifting arms 20. The lifting arms 20 are movable between a raised position (shown) and a lowered position (not shown). In the raised position, the lifting arms 20 are adapted to support and secure to a stretcher (not shown).

The trolley assembly 18 includes hydraulic means in the form of hydraulic cylinders (not shown) to move the lifting arms 20 between the raised position and the lowered position. The trolley assembly also includes an electric motor and a hydraulic pump (not shown) to provide hydraulic power to the hydraulic cylinders.

Figure 2:
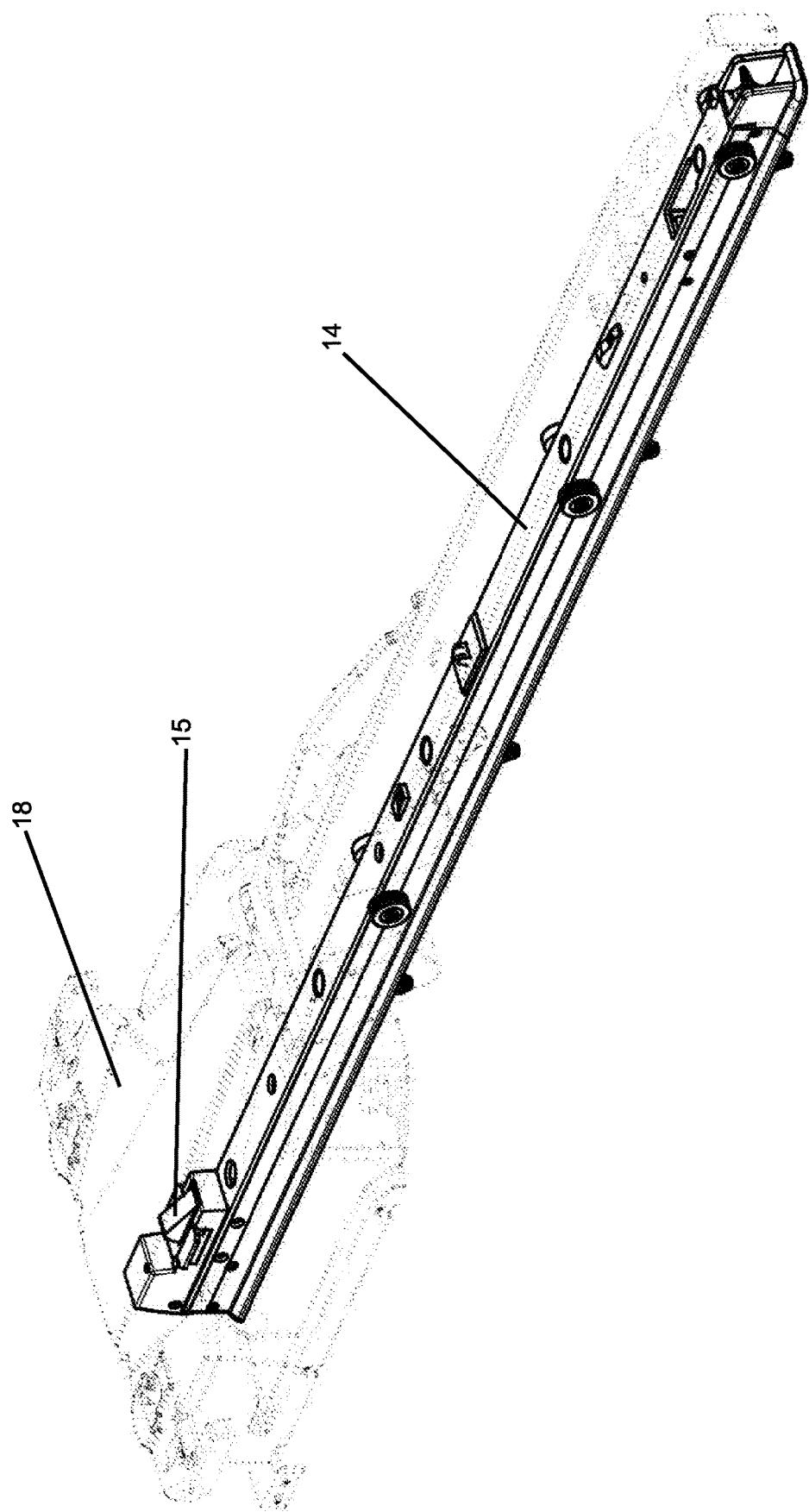
FIG. 2 is a perspective view of a rail member of the stretcher loading assembly of FIG. 1.

FIG. 2 shows the rail member 14 of FIG. 1 in more detail. The rail member 14 includes an attachment portion 15. The attachment portion 15 can secure the trolley assembly 18 (shown in dotted line format) to the rail member 14.

Figure 3:
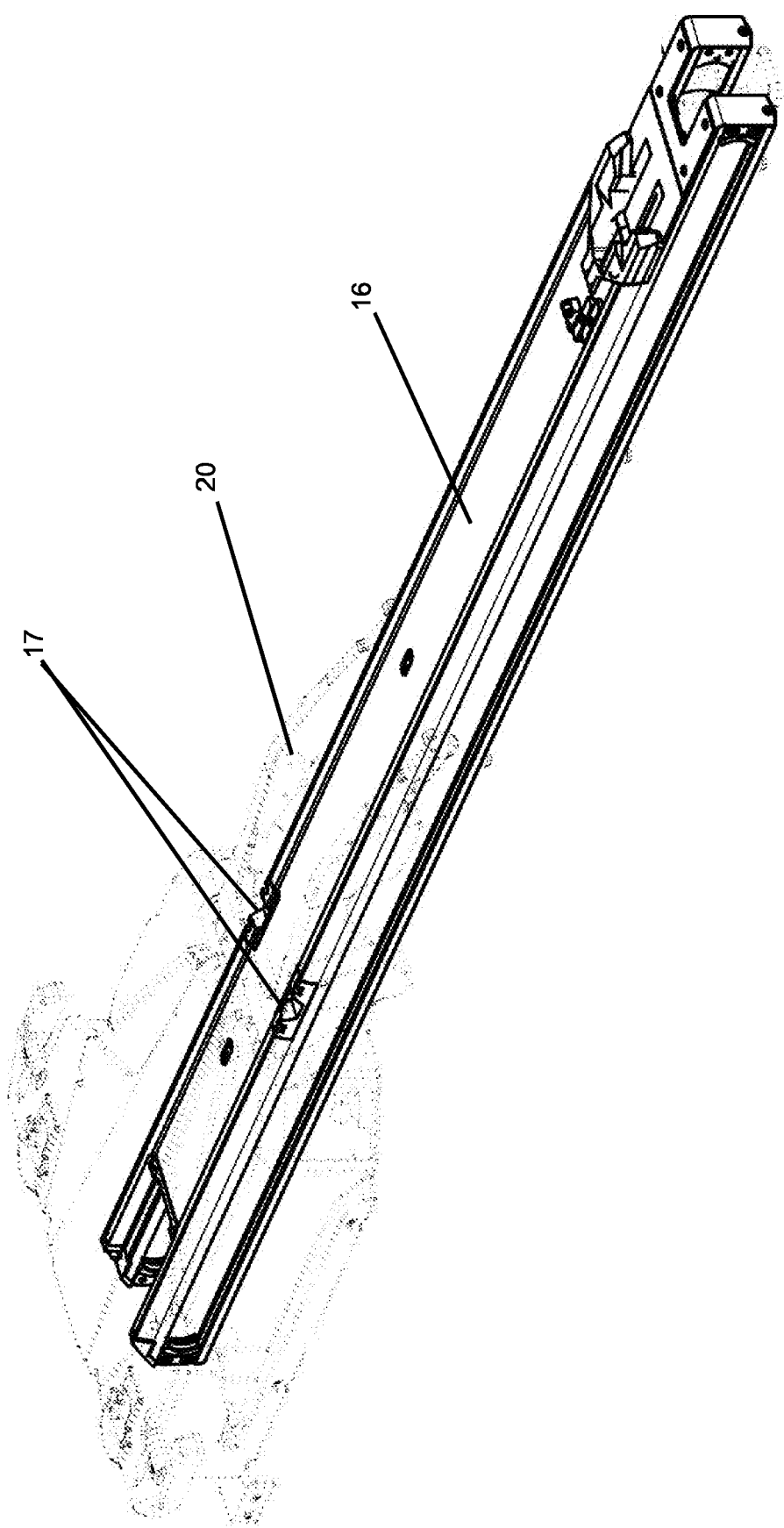
FIG. 3 is a perspective view of a traverse beam of the stretcher loading assembly of FIG. 1

FIG. 3 shows the traverse beam 16 of FIG. 1 in more detail. The traverse beam 16 includes securing portions 17. The securing portions 17 can secure the lifting arms 20 (shown in dotted line format) to the traverse beam 16. In use, the lifting arms 20 are lowered slightly from the raised position (when the trolley assembly is in the retracted position) to secure the lifting arms to the traverse beam.

Figure 4:
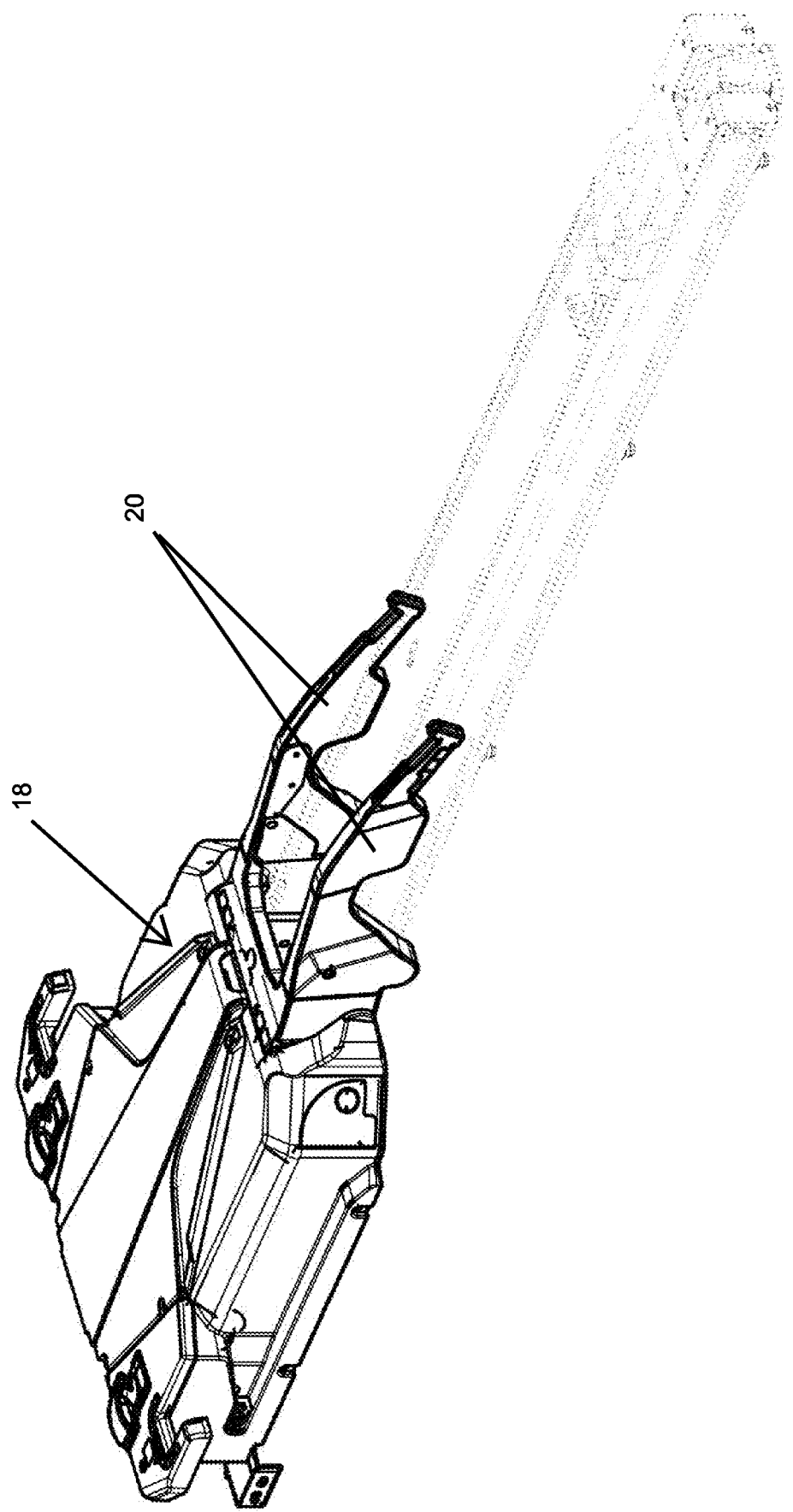
FIG. 4 is a perspective view of a trolley assembly of the stretcher loading assembly of FIG. 1.

FIG. 4 shows the trolley assembly 18 including the lifting arms 20 of FIG. 1 in more detail.

Figure 5:
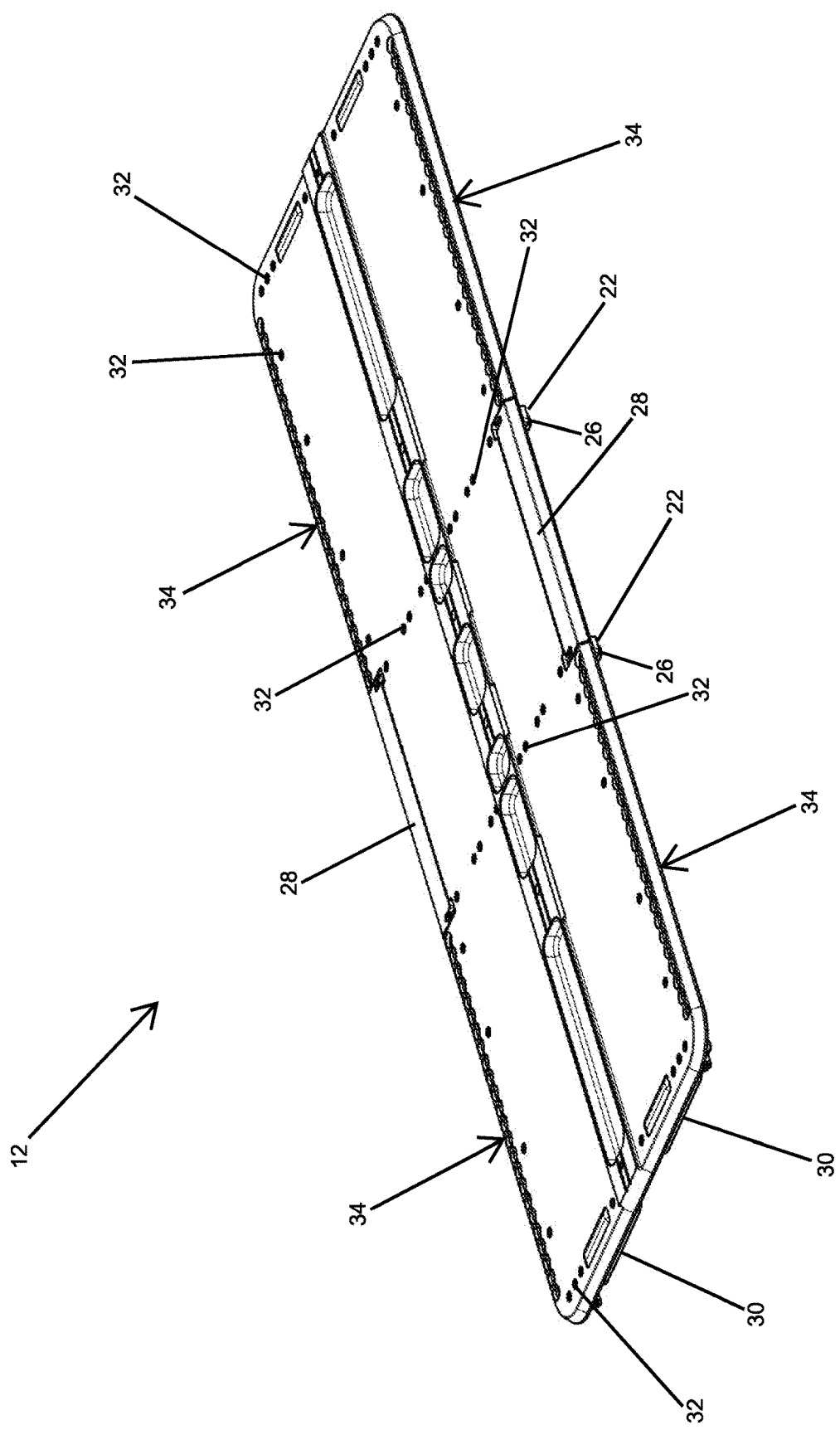
FIG. 5 is a perspective view of a support member of the stretcher loading assembly of FIG. 1.
Figure 6:
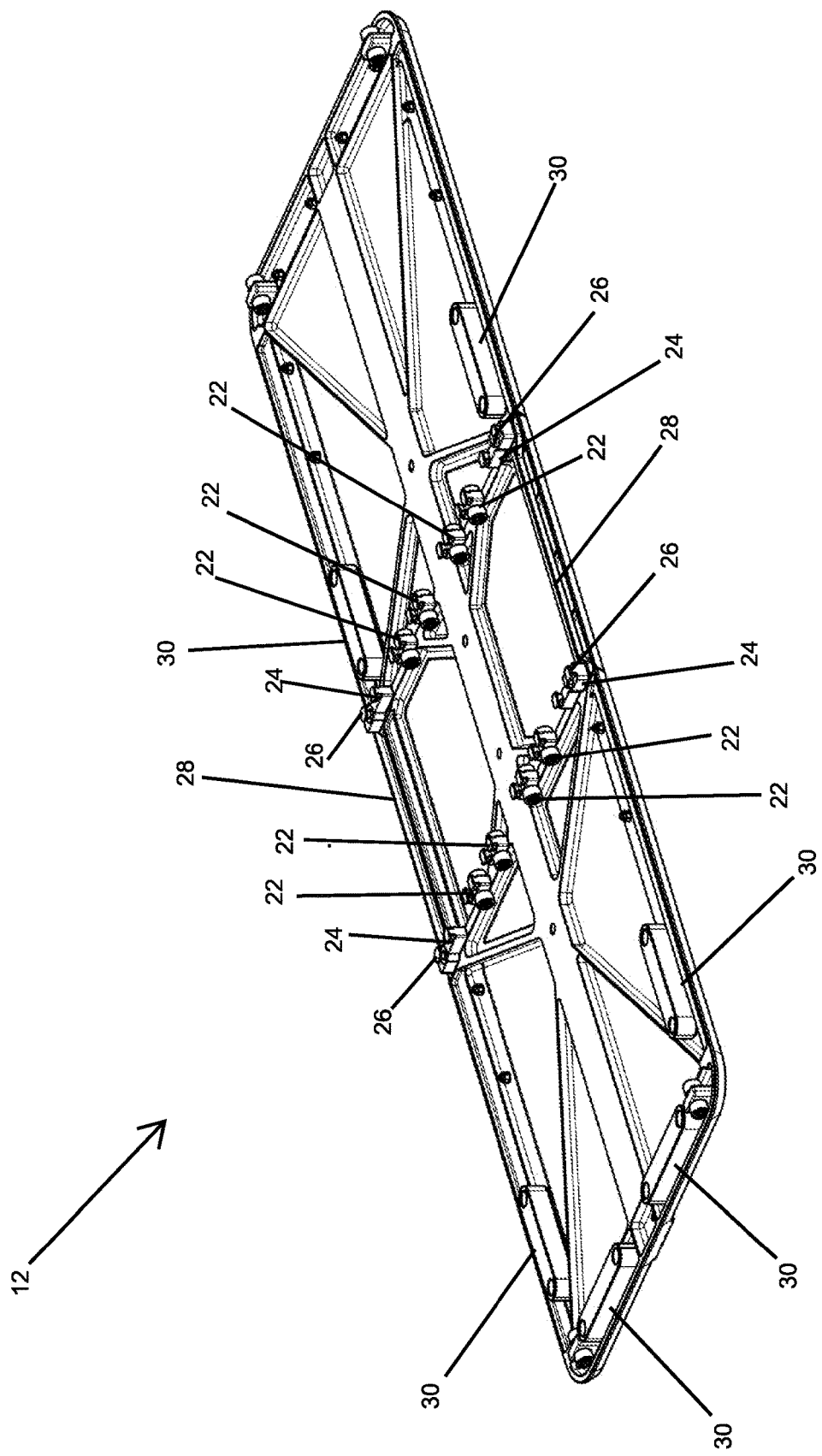
FIG. 6 is a bottom view of the support member of FIG. 5.

With reference to FIGS. 5 and 6, there is shown the support member 12 of FIG. 1 in more detail. The support member 12 includes a plurality of studs 22,24, which are locatable in L-tracks in an aircraft floor (not shown).

The studs 24 near the lateral sides of the support member 12 include stop members 26 which are adapted to releasably secure the support member 12 to the L-tracks. The stop members 26 are movable between a secured position in which they can secure the support member 12 to the L-tracks and a released position in which the studs can move in the L-tracks and/or be removed from the L-tracks.

Stop levers 28 are movable between a raised position (not shown) and lowered position. In the lowered position, the stop levers 28 hold the stop members 26 in the secured position. In the raised position, the stop levers 28 move the stop members 26 to the released position.

The studs 22,24 are arranged to fit into L-tracks that run transverse to the support member 12.

The support member 12 includes a plurality of spacers 30 which provide additional support to the support member 12 when located on an aircraft floor.

The support member 12 includes apertures 32 (only some numbered) to secure studs 22,24 and spacers 30 to the support member 12 using screws (not shown).

The support member 12 further includes attachment tracks in the form of L-tracks 34 adjacent each lateral side of the support member 12.

Figure 7:
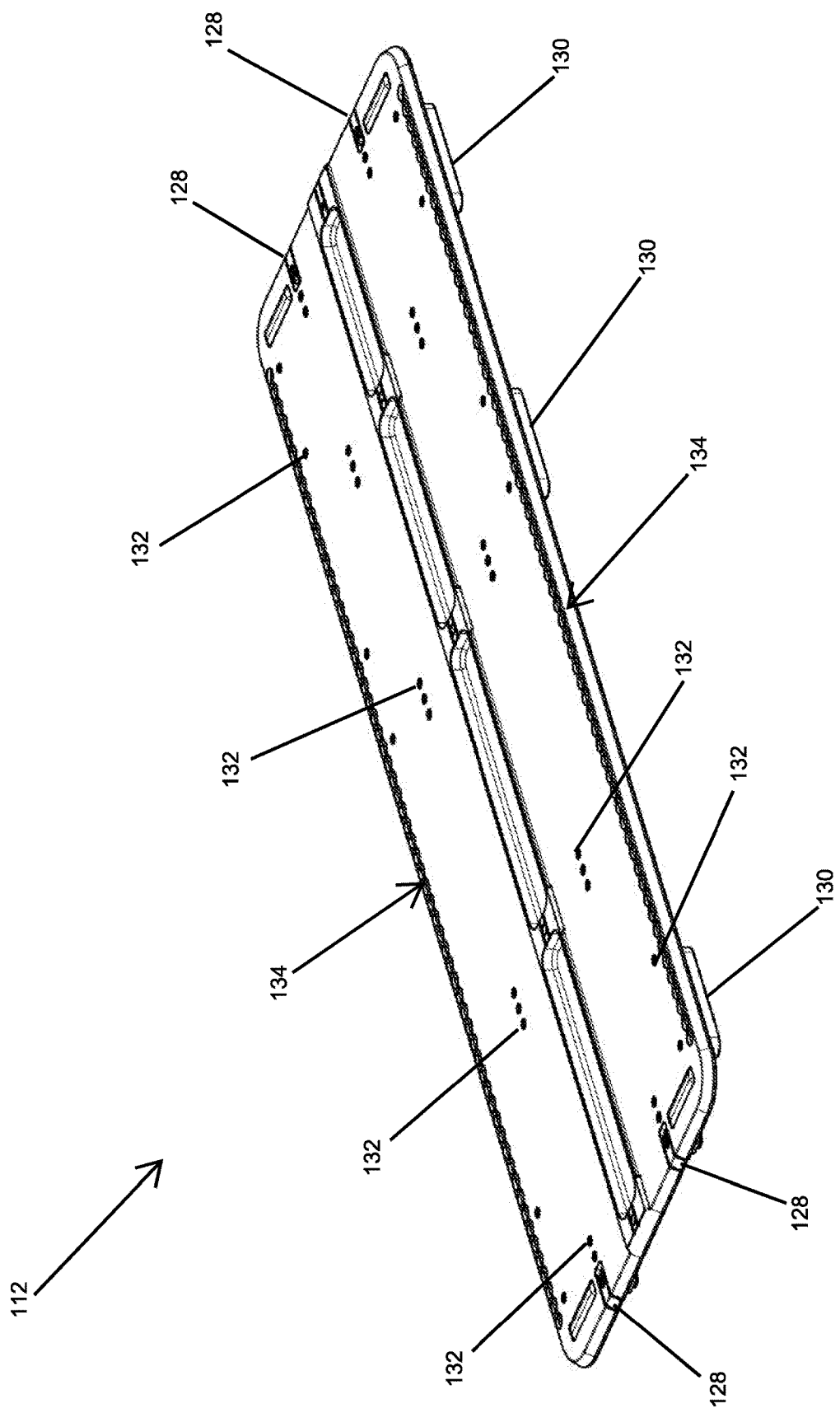
FIG. 7 is a perspective view of a support member according to a second preferred embodiment of the present invention.
Figure 8:
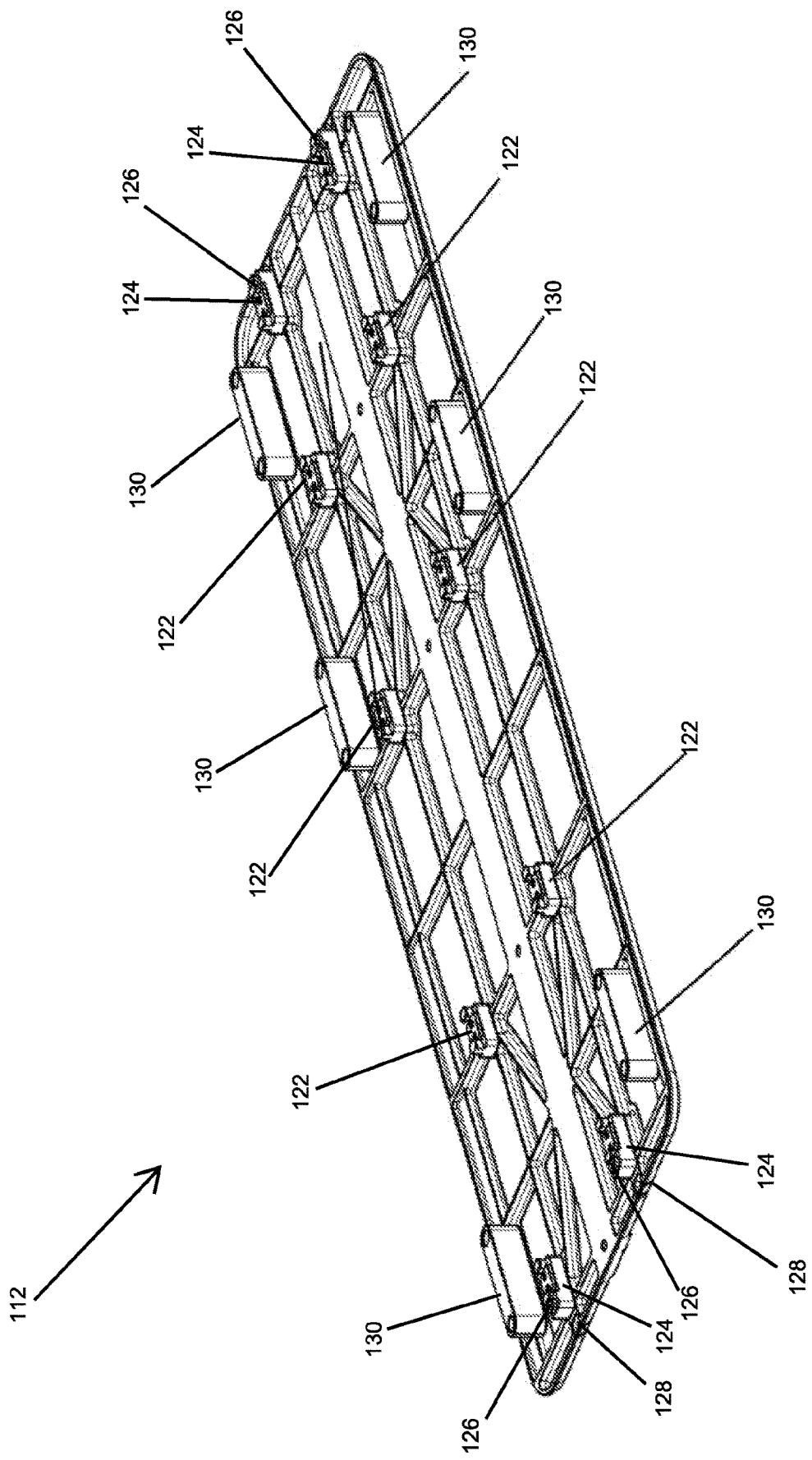
FIG. 8 is a bottom view of the support member of FIG. 7.

FIGS. 7 and 8 show a support member 112 according to a second preferred embodiment of the present invention. Similar numbering to the support member of FIGS. 5 and 6 has been used, with the addition of the prefix 1.

The support member 112 includes a plurality of studs 122,124, which are locatable in L-tracks in an aircraft floor (not shown).

The studs 124 near the ends of the support member 112 include stop members 126 which are adapted to releasably secure the support member 112 to the L-tracks. The stop members 126 are movable between a secured position in which they can secure the support member 112 to the L-tracks and a released position in which the studs can move in the L-tracks and/or be removed from the L-tracks.

Stop levers 128 are movable between a raised position (not shown) and lowered position. In the lowered position, the stop levers 128 hold the stop members 126 in the secured position. In the raised position, the stop levers 128 move the stop members 126 to the released position.

The studs 122,124 are arranged to fit into L-tracks that run lengthwise to the support member 112.

The support member 112 includes a plurality of spacers 130 which provide additional support to the support member 112 when located on an aircraft floor.

The support member 112 includes apertures 132 (only some numbered) to secure studs 122,124 and spacers 130 to the support member 112 using screws (not shown).

The support member 112 further includes attachment tracks in the form of L-tracks 134 adjacent each lateral side of the support member 112. Attachment members (not shown) can be attached to the L-tracks 134.

Figure 9:
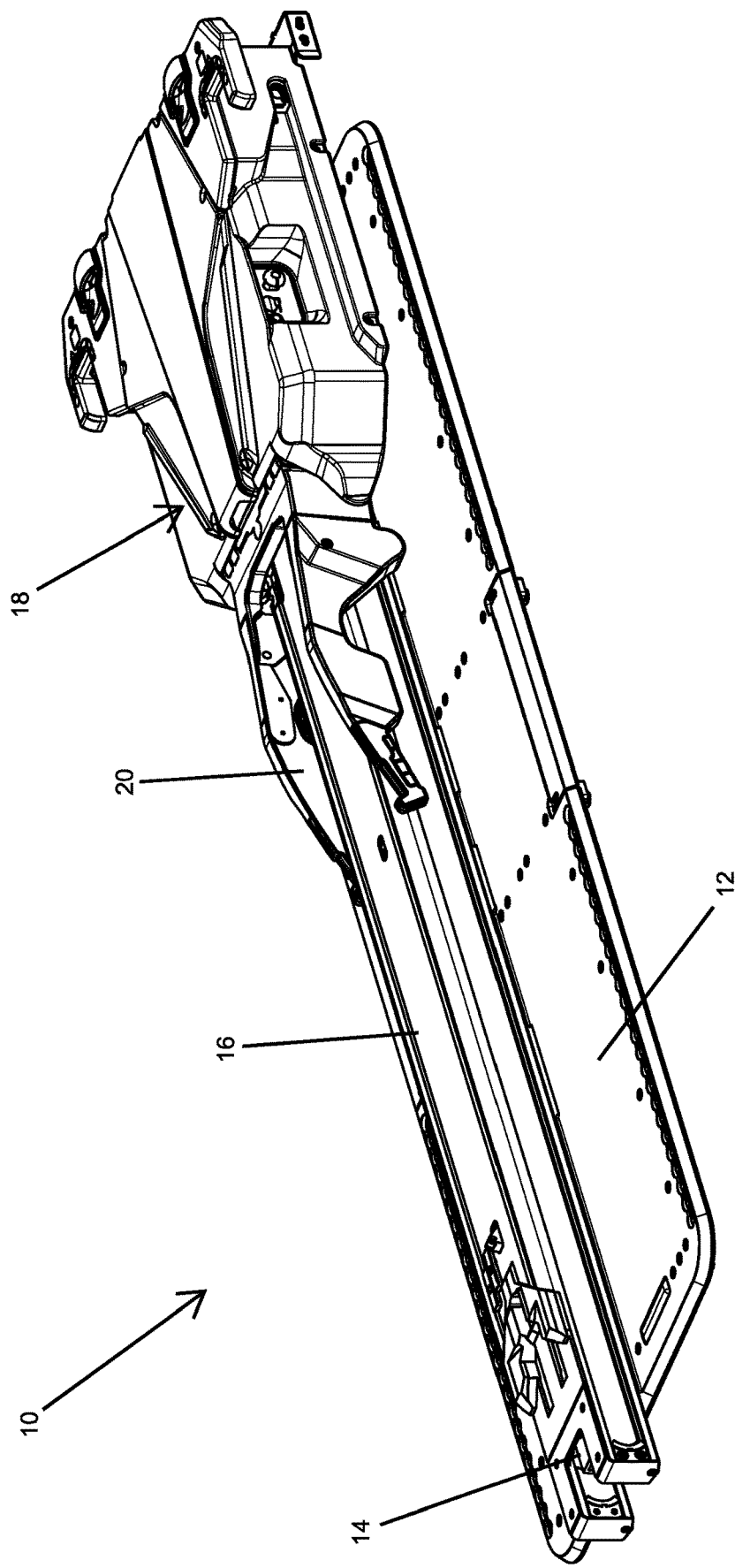
FIG. 9 is a perspective view of the stretcher loading assembly of FIG. 1 in a retracted position.

With reference to FIG. 9, there is shown the stretcher loading assembly 10 of FIG. 1. The traverse beam 16 is in the retracted position. The trolley assembly 18 is in the retracted position. The lifting arms 20 are in the raised position.

Figure 10:
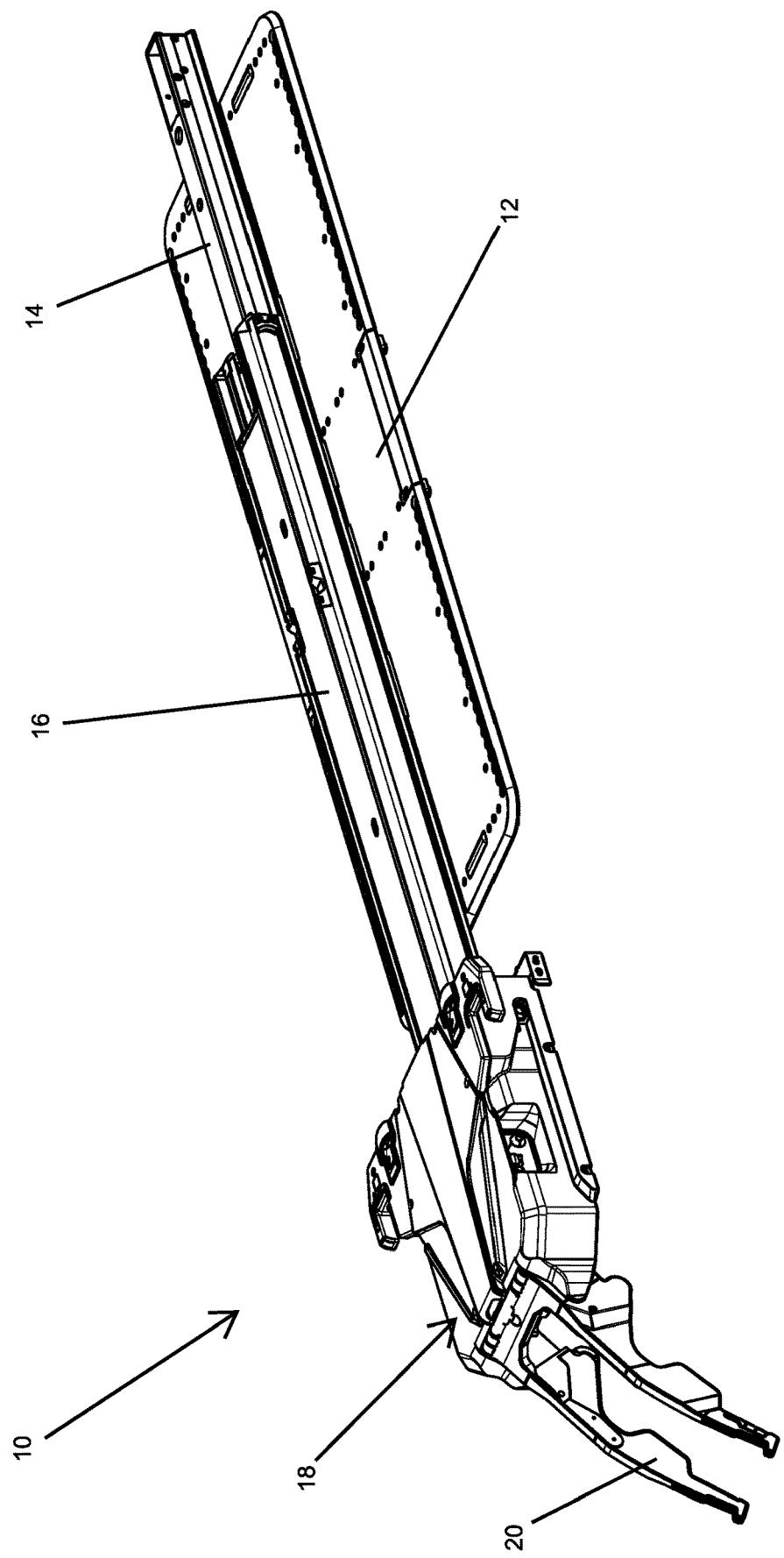
FIG. 10 is a perspective view of the stretcher loading assembly of FIG. 1 in an extended position.

With reference to FIG. 10, there is shown the stretcher loading assembly 10 of FIG. 1. The traverse beam 16 is in the extended position. The trolley assembly 18 is in the extended position. The lifting arms 20 are in the lowered position. In this position, the stretcher loading assembly can accept a stretcher (not shown).

Figure 11:
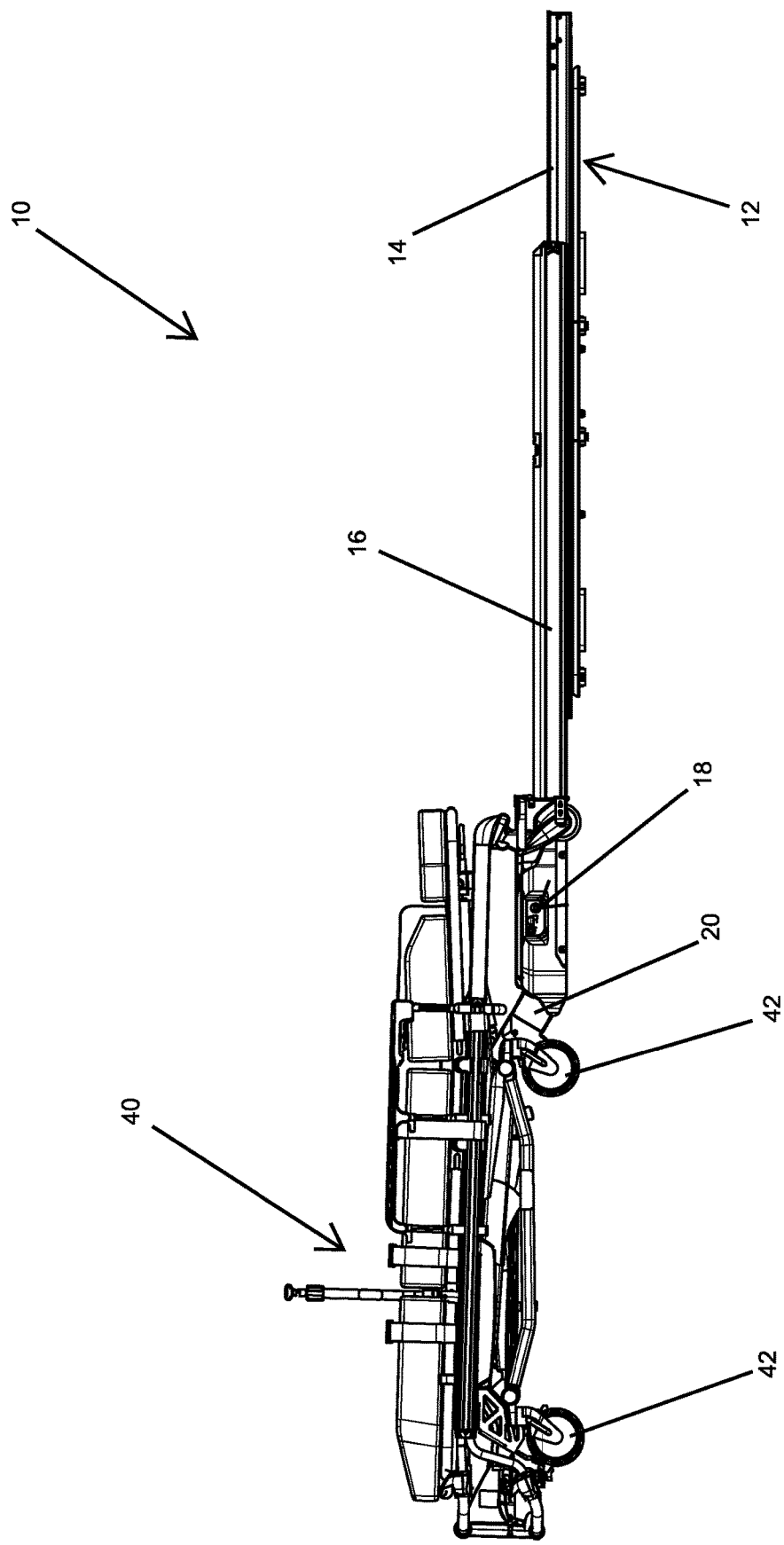
FIGS. 11-13 show the loading sequence of a stretcher using the stretcher loading assembly of FIG. 1.
Figure 12:
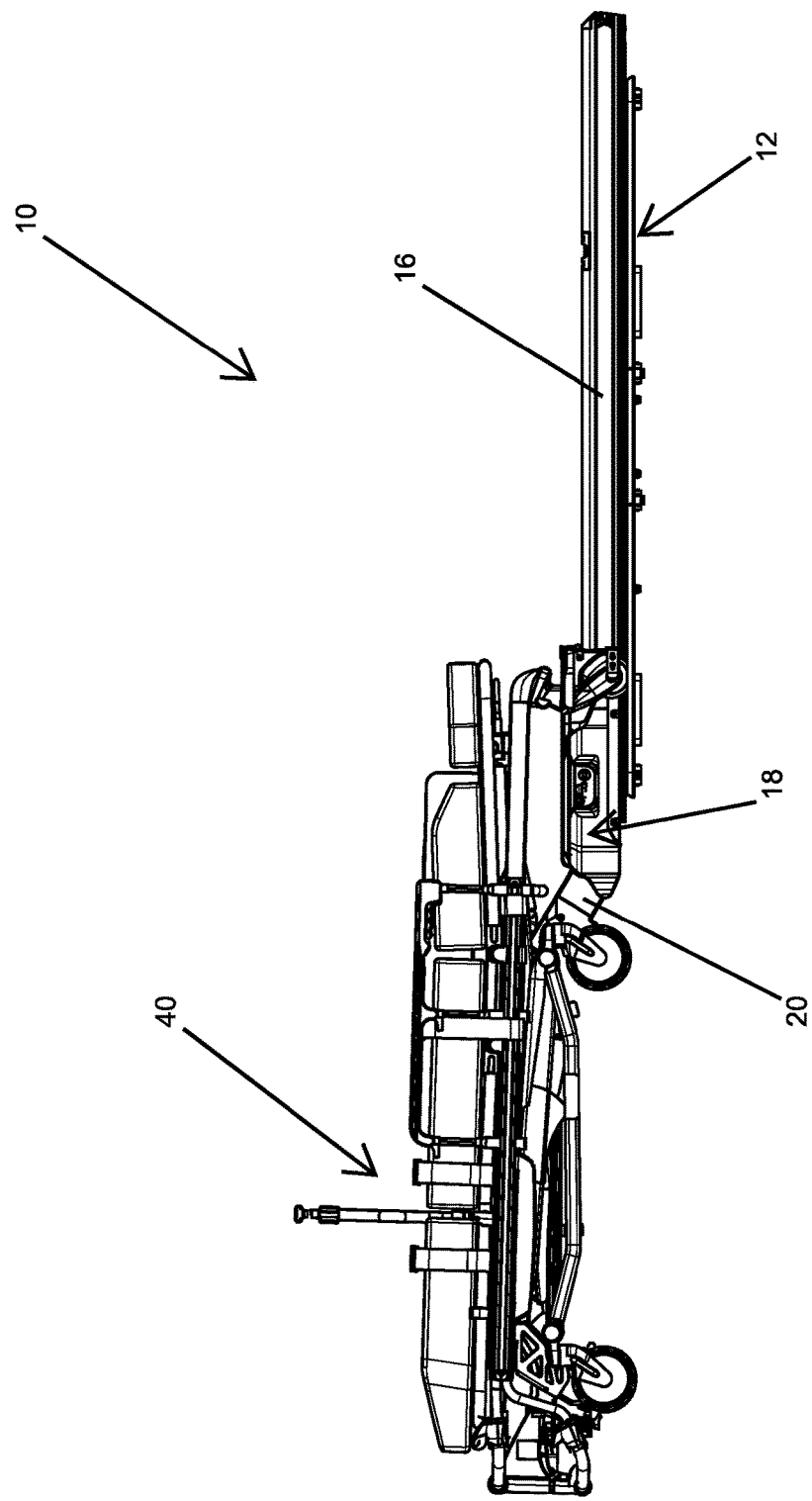
Figure 13:
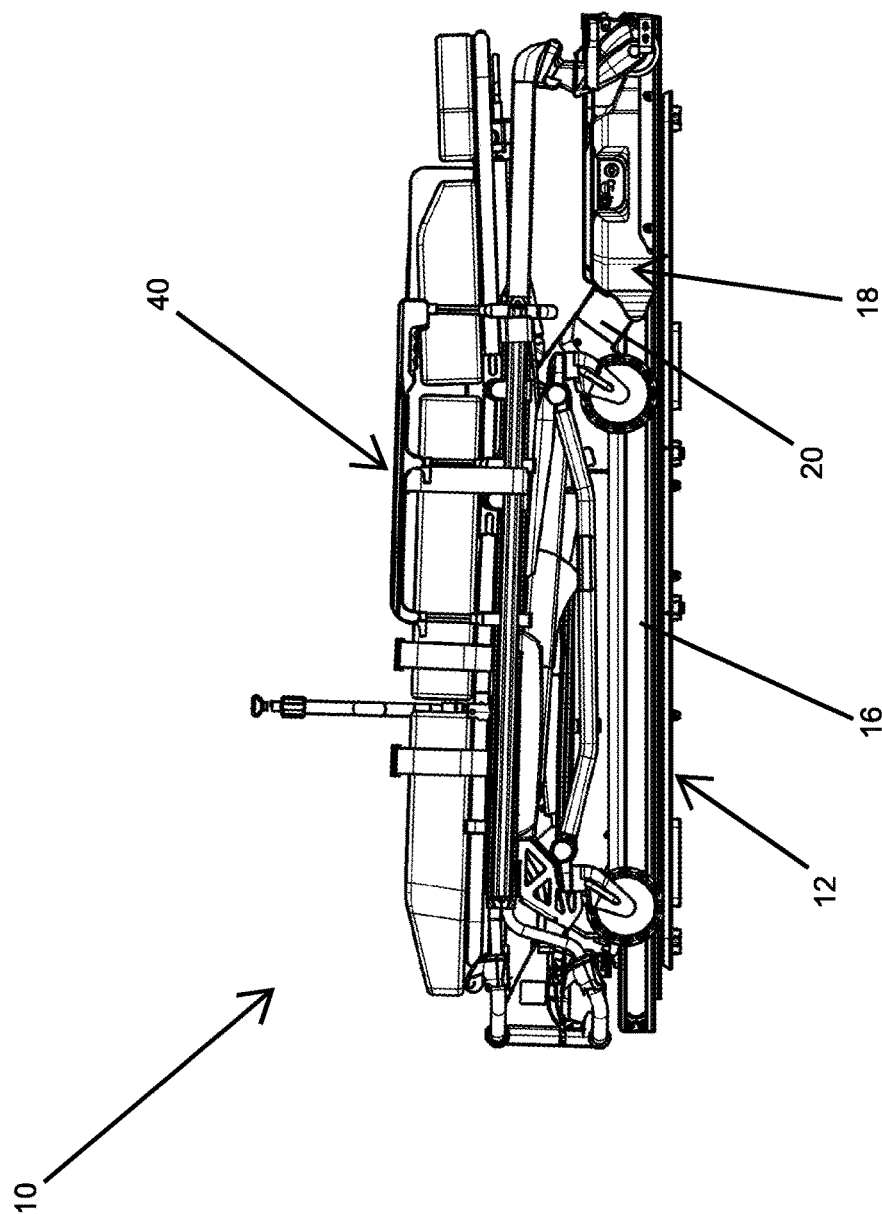

With reference to FIGS. 11-13, there is shown a sequence of a stretcher 40 being loaded onto the stretcher loading assembly 10 of FIG. 1.

With reference to FIG. 11, the stretcher loading assembly 10 has accepted a stretcher 40 and the lifting arms 20 have moved to the raised position to support and secure the stretcher 40. Wheels 42 of the stretcher 40 have been raised after the lifting arms 20 have supported and secured the stretcher 40. The trolley assembly 18 is in the extended position and the traverse beam 16 is in the extended position.

With reference to FIG. 12, the traverse beam 16 has moved to the retracted position.

With reference to FIG. 13, the trolley assembly 18 has moved to the retracted position. The lifting arms 20 have been slightly lowered from the raised position to secure the trolley assembly to the traverse beam 16, and to lower and secure the stretcher 40 onto the traverse beam 16.

Figure 14:
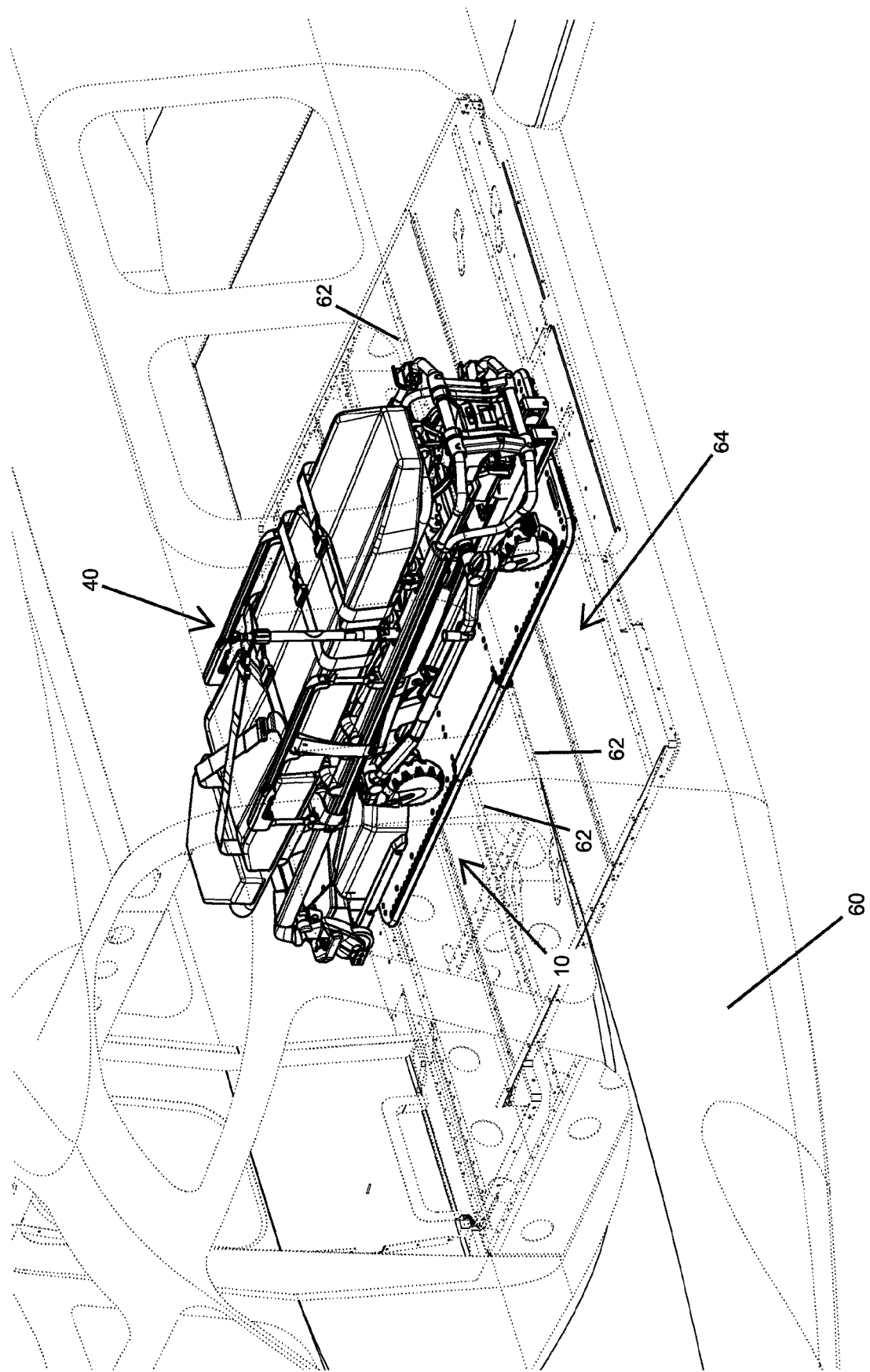
FIG. 14 shows the location of the stretcher loading assembly of FIG. 1 in an aircraft.

With reference to FIG. 14, there is shown the stretcher loading assembly 10 of FIG. 1 positioned in an aircraft 60. The support member 12 is attached to L-tracks 62 in a floor 64 of the aircraft 60 by studs (not shown). A stretcher 40 is shown loaded onto the stretcher loading assembly 10.

Figure 15:
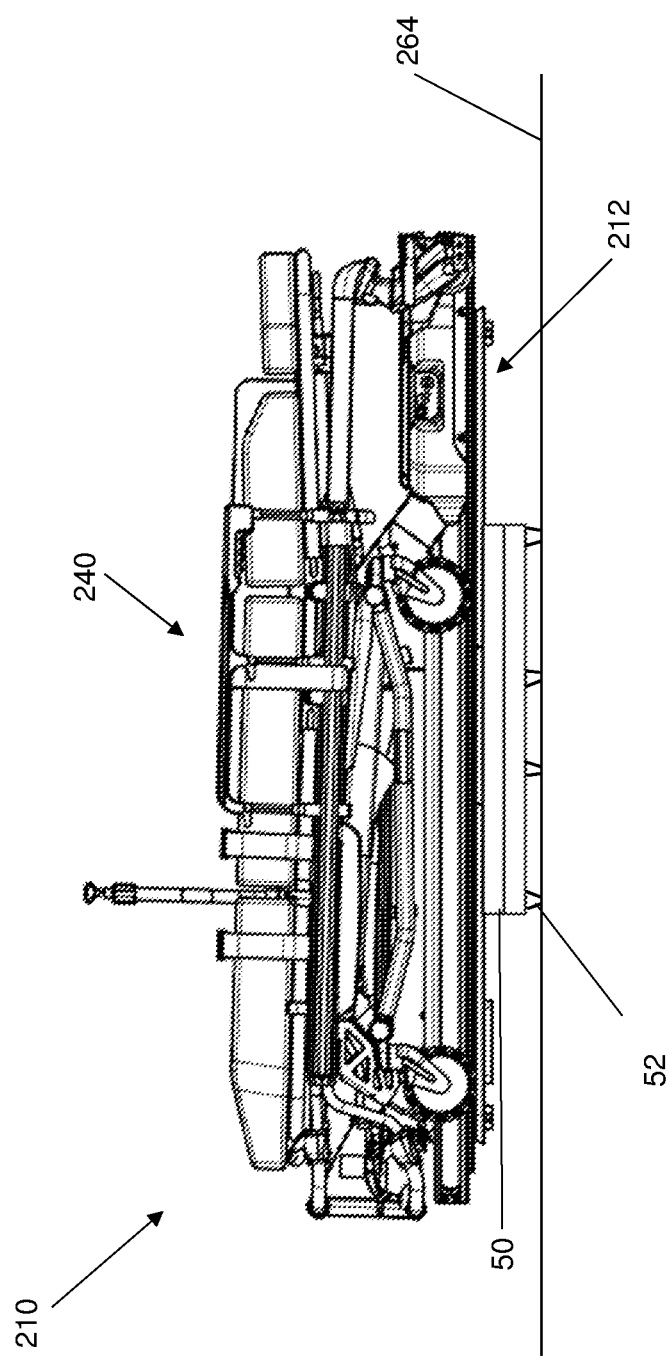
FIG. 15 is a schematic side view of a support member according to a third preferred embodiment of the present invention.

With reference to FIG. 15, there is shown a support member 212 according to a third preferred embodiment of the present invention. Similar numbering to the support member of FIG. 13 has been used, with the addition of the prefix 2. The support member 212 is attached to a turntable 50. The turntable 50 is attached to the aircraft floor 264 by a plurality of studs 52. The turntable 50 enables the support member 212 to be rotated relative to the aircraft floor 264. A stretcher 240 is shown loaded onto the stretcher loading assembly 210.

Advantages

An advantage of the preferred embodiment of the stretcher loading assembly includes eliminating patient stretcher transfer and improving the 'Golden Hour' response time. Another advantage of the preferred embodiment of the stretcher loading assembly includes the ability to load stretchers used in road ambulances into aircraft. A further advantage of the preferred embodiment of the stretcher loading assembly includes the ability to move the stretcher loading assembly inside the aircraft along tracks in the floor. A further advantage of the preferred embodiment of the stretcher loading assembly includes the ability to appropriately distributing loads from the stretcher loading assembly into the floor of the aircraft using the support member.

VARIATIONS

While the foregoing has been given by way of illustrative example of this invention, all such and other modifications and variations thereto as would be apparent to persons skilled in the art are deemed to fall within the broad scope and ambit of this invention as is herein set forth.

Throughout the description and claims of this specification the word "comprise" and variations of that word such as "comprises" and "comprising", are not intended to exclude other additives, components, integers or steps.

The invention claimed is:

1. A stretcher loading assembly comprising:
a support member operatively attachable to an aircraft floor;
an elongate rail member attached to the support member;
an elongate traverse beam movably attached to the rail member;
a trolley assembly movably attached to the traverse beam, the trolley assembly including lifting means movable between a lowered position and a raised position, the lifting means adapted to support a stretcher in the raised position; and
a turntable member located between the support member and the aircraft floor, the turntable member enabling the support member to be rotated relative to the aircraft floor,
wherein the support member is at least twice as wide as the rail member,
wherein the turntable member is attached to tracks attached to or incorporated into the aircraft floor,
wherein the turntable member is attached to the tracks by a plurality of studs attached to the turntable member,
wherein each of the plurality of studs is releasably and movably attachable to one of the tracks,
wherein each of the plurality of studs has a stop member adapted to releasably secure the support member to one of the tracks, and
wherein the stretcher loading assembly includes one or more stop levers movable between a first position in which the plurality of studs are movable relative to the tracks and a second position in which each of the plurality of studs are secured by the respective stop member relative to the tracks.

2. The stretcher loading assembly as claimed in claim 1, wherein the support member is at least 1.5 m in length and at least 500 mm in width.

3. An aircraft having
a stretcher loading assembly comprising
a support member operatively attached to a floor of the aircraft;
an elongate rail member attached to the support member;
an elongate traverse beam movably attached to the rail member;
a trolley assembly movably attached to the traverse beam, the trolley assembly including lifting means movable between a lowered position and a raised position, the lifting means adapted to support a stretcher in the raised position; and
a turntable member located between the support member and the aircraft floor, the turntable member enabling the support member to be rotated relative to the aircraft floor,
wherein the support member is at least twice as wide as the rail member,
wherein the turntable member is attached to tracks attached to or incorporated into the aircraft floor,
wherein the turntable member is attached to the tracks by a plurality of studs attached to the turntable member,
wherein each of the plurality of studs is releasably and movably attachable to one of the tracks,
wherein each of the plurality of studs has a stop member adapted to releasably secure the support member to one of the tracks, and
wherein the stretcher loading assembly includes one or more stop levers movable between a first position in which the plurality of studs are movable relative to the tracks and a second position in which each of the plurality of studs are secured by the respective stop member relative to the tracks.

4. The aircraft as claimed in claim 3, wherein the aircraft is a helicopter.

5. The aircraft as claimed in claim 3, wherein the aircraft is a fixed wing aircraft.

6. A method of loading a stretcher into an aircraft, using a stretcher loading assembly as described in claim 1, the method comprising the steps of
- moving the traverse beam to an extended position relative to the rail member;
- moving the trolley assembly along the traverse beam to an extended position distal to the rail member when the traverse beam is in the extended position;
- moving the lifting arms to the lowered position;
- positioning a stretcher adjacent the loading assembly;
- moving the lifting arms to the raised position to support the stretcher;
- moving the trolley assembly to a retracted position proximal to the rail member;
- moving the traverse beam to a retracted position relative to the rail member; and
- rotating the stretcher relative to a floor of the aircraft.

7. The method as claimed in claim 6, further including the step of securing the stretcher to the support member.

8. The method as claimed in claim 7, wherein the step of securing the stretcher to the support member includes securing the stretcher to attachment tracks of the support member.

9. The method as claimed in claim 7, wherein the stretcher is attached to attachment members by straps, and the attachment members are attached to the attachment tracks of the support member.

10. The method as claimed in claim 6, further including the step of lowering the lifting arms towards the lowered position when the trolley assembly is in the retracted position such that the stretcher is lowered onto the traverse beam.

11. The method as claimed in claim 10, wherein when the stretcher is lowered onto the traverse beam, the stretcher engages with and is secured to the traverse beam.

12. A stretcher loading assembly comprising
- a support member operatively attachable to an aircraft floor;
- an elongate rail member attached to the support member;
- an elongate traverse beam movably attached to the rail member;
- a trolley assembly movably attached to the traverse beam, the trolley assembly including lifting means movable between a lowered position and a raised position, the lifting means adapted to support a stretcher in the raised position; and
- a turntable member located between the support member and the aircraft floor, the turntable member enabling the support member to be rotated relative to the aircraft floor,
- wherein the support member is at least 500 mm in width,
- wherein the turntable member is attached to tracks attached to or incorporated into the aircraft floor,
- wherein the turntable member is attached to the tracks by a plurality of studs attached to the turntable member,
- wherein each of the plurality of studs is releasably and movably attachable to one of the tracks,
- wherein each of the plurality of studs has a stop member adapted to releasably secure the support member to one of the tracks, and
- wherein the stretcher loading assembly includes one or more stop levers movable between a first position, in which the plurality of studs are movable relative to the tracks, and a second position, in which each of the plurality of studs are secured by the respective stop member relative to the tracks.

\* \* \* \* \*